No. 818,154. PATENTED APR. 17, 1906.
M. EKENBERG.
FILTER PRESS.
APPLICATION FILED NOV. 3, 1904.

3 SHEETS—SHEET 1.

Witnesses
Inventor
Martin Ekenberg
By his Attorney

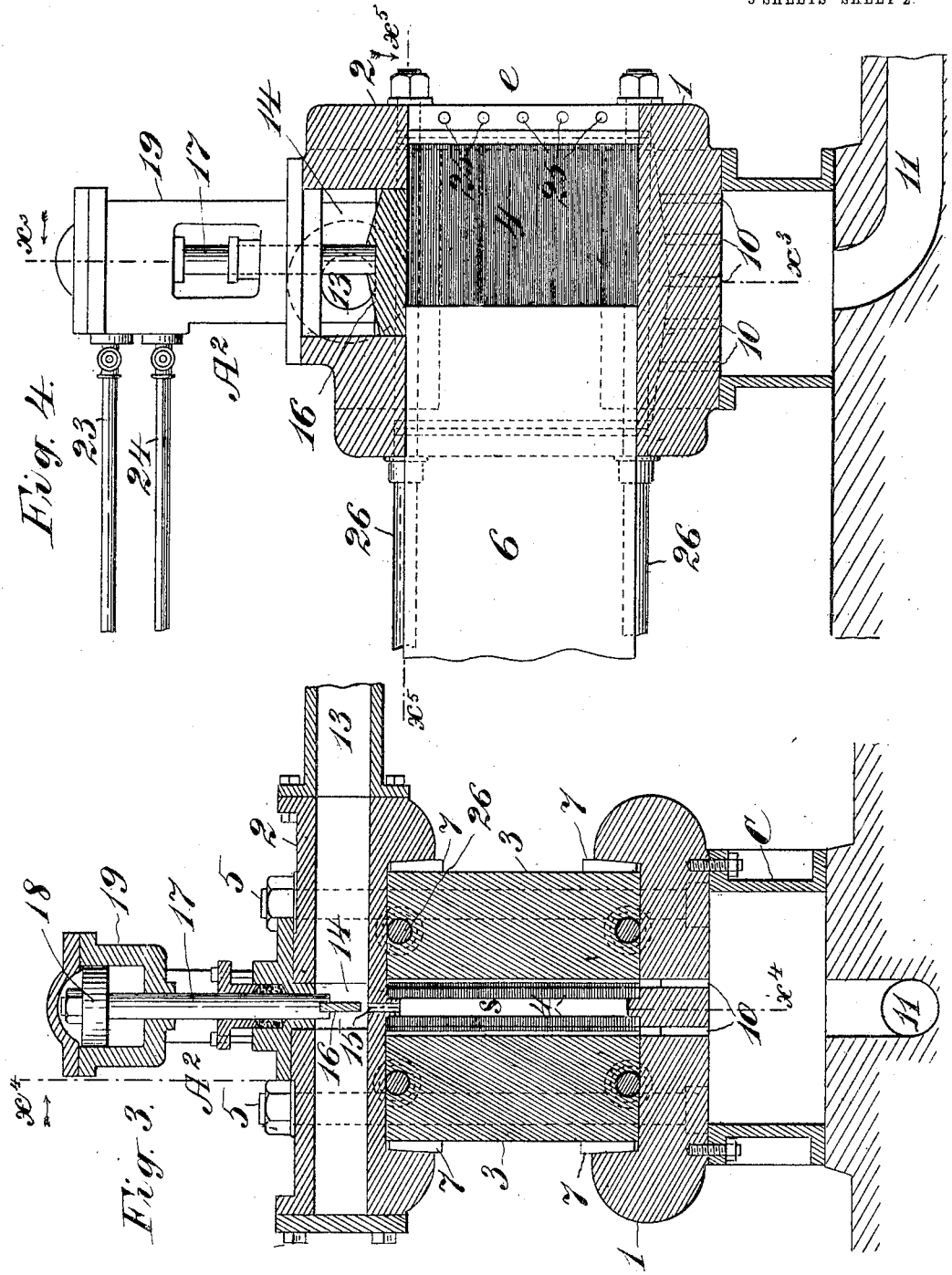

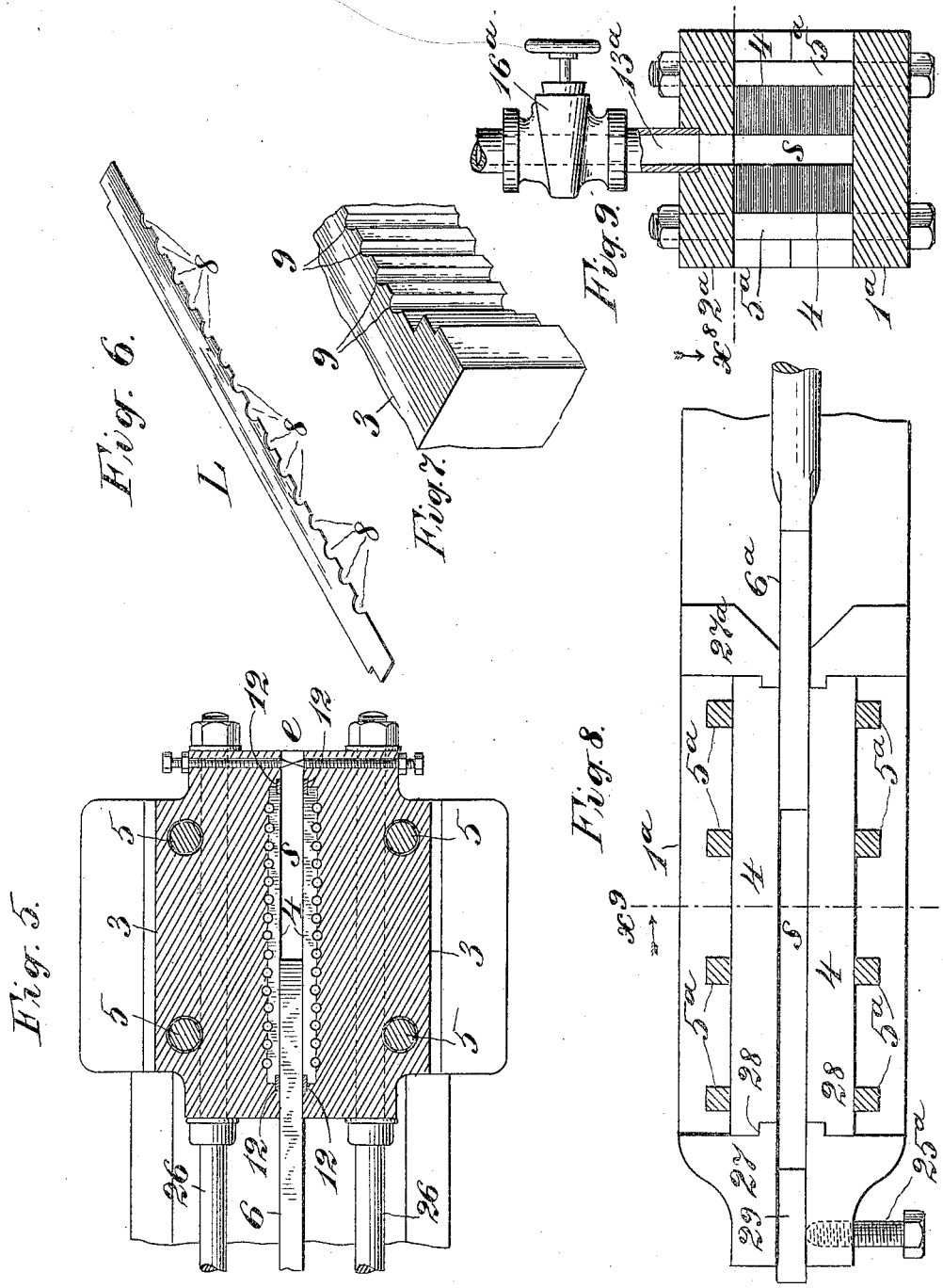

UNITED STATES PATENT OFFICE.

MARTIN EKENBERG, OF STOCKHOLM, SWEDEN.

FILTER-PRESS.

No. 818,154.　　　　Specification of Letters Patent.　　　Patented April 17, 1906.

Application filed November 3, 1904. Serial No. 231,291.

*To all whom it may concern:*

Be it known that I, MARTIN EKENBERG, a subject of the King of Sweden and Norway, and a resident of Stockholm, Sweden, have invented certain new and useful Improvements in Filter-Presses, of which the following is a specification.

This invention relates to that class of filtering mechanisms wherein the separated fluid is forced under pressure through interstices too small to allow the solid matter to pass. In constructing such presses it has not heretofore been found possible, so far as I am aware, to attain three important requisites in one apparatus—namely, strength and durability, perfect separation of the fluid from the solid matter, and the ability to filter quickly a large quantity of fluid. The press herein described has these requisites: It is strong and durable, it will filter rapidly, it will effect a very thorough separation of the fluid from the solid matter, and it is self-cleaning in a high degree.

The novelty of the invention resides partly in the construction of the filter-plates, partly in the construction whereby the press becomes self-cleaning and delivers the solid material as the filtering proceeds, and partly in certain details of construction, which will be hereinafter described.

Figure 1:
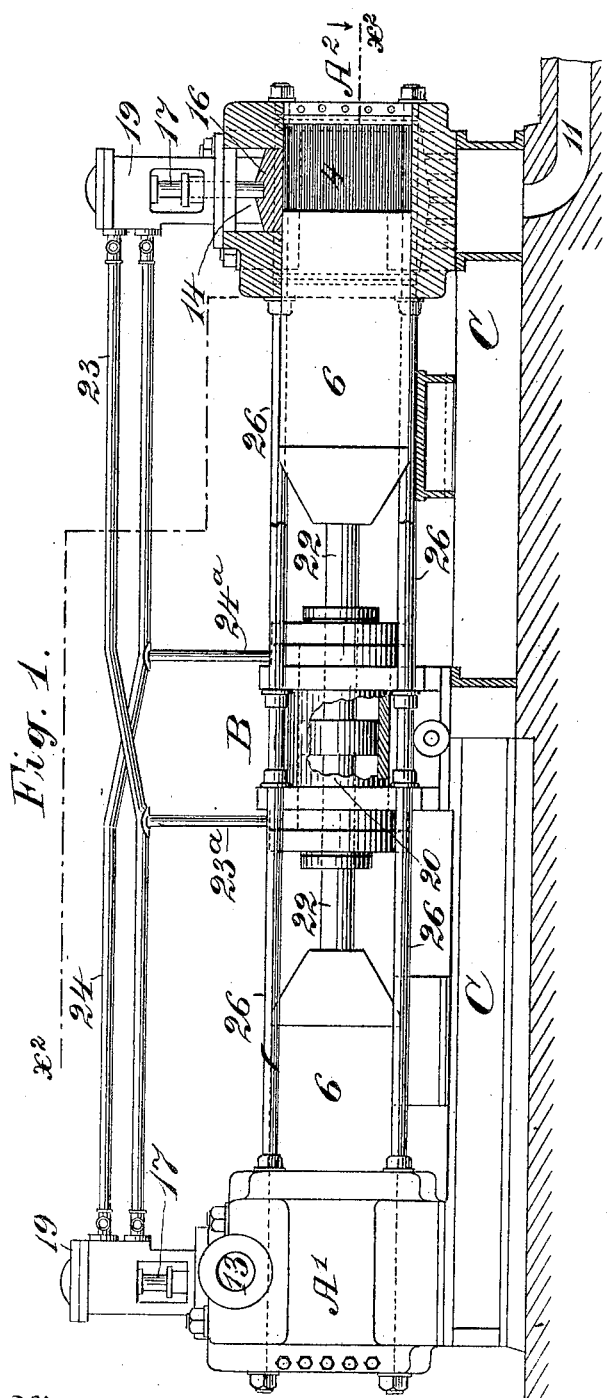
Figure 2:
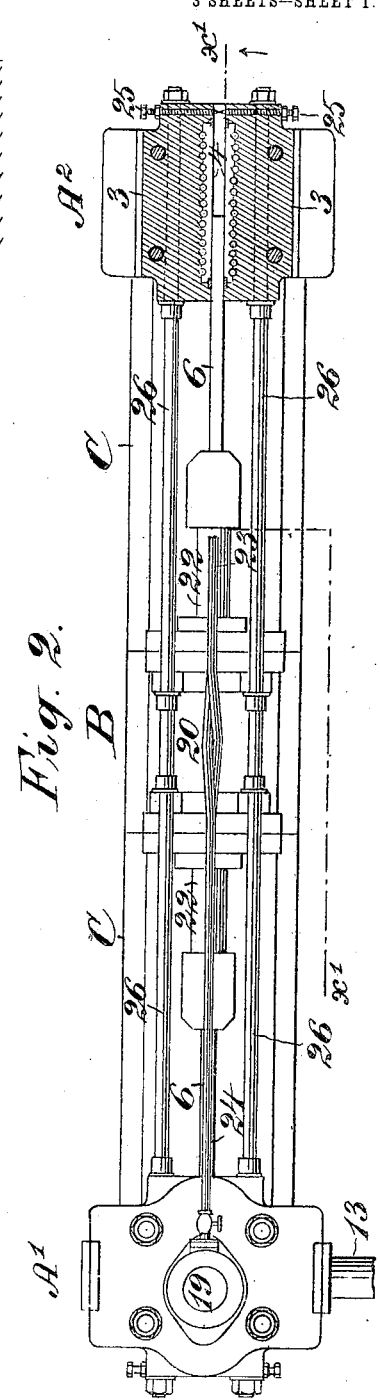

In the accompanying drawings, which illustrate an embodiment of the invention, Figure 1 is a side elevation of a double filter-press constructed according to this invention, the press at the right being in vertical section at line $x'$ in Fig. 2; and Fig. 2 is a plan of the same, the press at the right being in horizontal section at line $x^2$ in Fig. 1. These views are on a relatively small scale. Fig. 3 is a transverse vertical section of a press on a larger scale than Figs. 1 and 2, the plane of the section being taken substantially at line $x^3$ in Fig. 4. Fig. 4 is a vertical longitudinal section taken substantially at line $x^4$ in Fig. 3. Fig. 5 is a sectional plan taken at line $x^5$ in Fig. 4. Fig. 6 is a perspective view of one of the laminæ of the filter-plate, and Fig. 7 is a fragmentary view of a part of one of the grooved backing plates or blocks of the filter. Figs. 8 and 9 illustrate a single filter-press of more simple construction. Fig. 8 is a sectional plan, the plane being indicated by line $x^8$ in Fig. 9; and Fig. 9 is a cross-section at line $x^9$ in Fig. 8.

Referring primarily to the first seven figures of the drawings, which show two like filter-presses operated alternately from a reciprocating engine, A' and A² designate the presses, B the engine, and C the supporting bed-plate. As seen best in Figs. 3, 4, and 5, the press consists of a base-piece 1; a cap-piece 2; two upright side plates 3 3, the respective ends of which occupy recesses in the cap and base pieces; the filter-plates 4 4, applied to the inner faces of the side plates and also occupying the recesses in the cap and base pieces; bolts 5, which extend down through all of parts, as shown; a flat piston 6, which plays between the two filter-plates in a space $s$, Figs. 3 and 5, and means for supplying the fluid to the space $s$ for the purpose of filtering it. The space between the recesses in both the cap-piece and base-piece equals the width of the space $s$ and also the thickness of the piston 6, and the plates 3 press the filter-plates up to the shoulders formed by said recesses, being driven in by suitable wedges 7 or the like. The filter-plates 4 constitute a very important feature of the press, and as they are alike a particular description of one of them will suffice. Each filter-plate is composed of a plurality of thin metal sheets, superposed and clamped more or less forcibly between the cap and base plates, as clearly seen in Fig. 3, the pressure being capable of variation by adding to or reducing the number of the sheets employed. Obviously the tighter or more firmly the sheets are pressed together the smaller or more contracted will be the filtering interstices between them. Preferably these sheets will be very thin—say about 0.100 millimeter, for example—and the resistance of the filter-plate to the pressure used for forcing a fluid through the filtering interstices will vary according to the width of the sheets used in forming the filter-plate. In Fig. 6 one of these sheets or lamina is shown detached, and this view, taken in connection with Figs. 3, 5, and 7, shows the means employed for leading off the filtered fluid. In the back or outer edge of the sheet or lamina (L in Fig. 6) are recesses or notches 8, which register with upright grooves 9, Fig. 7, in the inner faces of the plates 3, and thus form passages for the fluid leading down to channels 10 in the base-piece, as seen in Fig. 3. The fluid flows off at a suitable outlet-passage 11, arranged in any convenient way. The piston 6 moves in a path parallel to the planes of the sheets or laminae, as herein shown, and its path is at right angles to that of the flow of fluid from the space or chamber s—that is to say, the piston moves lengthwise of the sheets and the fluid flows out widthwise thereof. At each end of the filter-plates is a suitable packing 12 for the piston. The fluid material to be filtered is supplied by a pipe 13, which connects with a chamber 14 in the cap-piece 2, through a passage in the latter, and the chamber 14 connects with the chamber s of the press by a port 15, adapted to be closed by a valve 16, movable up and down in suitable guides in the chamber 14. This valve has a stem 17, which carries at its upper end a piston 18, Fig. 3, playing in a cylinder 19, mounted on the cap-piece, as clearly shown in Figs. 3 and 4. Obviously if the piston be moved up, as in Fig. 3, the valve 16 will be lifted and the port 15 opened and that if it be moved down, as in Fig. 4, the valve will be moved down and said port closed.

The operation of the double or duplex press will now be described.

Between the presses A' and A² is the engine B, which may be a liquid-engine, with a cylinder 20, a piston 21, playing therein, and a piston-rod 22, carrying at its respective ends the pistons 6 of the respective presses. The usual valve devices will be or may be employed for admitting liquid to and exhausting it from the cylinder of the engine; but these have not been shown, as they are well known and form no specific part of the present invention. It will suffice to say that the liquid in the engine imparts a regular reciprocating movement to the piston-rod 22, thus retracting one of the press-pistons 6, while it advances the other press-piston. A cock-controlled pipe 23 connects the upper end of the cylinder 19 of press A² with the lower end of the corresponding cylinder of press A', and a similar pipe 24 connects the upper end of the cylinder 19 of the press A' with the lower end of the corresponding cylinder of press A². A branch pipe 23ª leads from the pipe 23 to the left-hand end of the engine-cylinder, and a branch pipe 24ª leads from the pipe 24 to the right-hand end of the engine-cylinder. When liquid under pressure is admitted to the right-hand end of the engine-cylinder, it flows in part through the branch 24ª to the pipe 24, and thence to the under side of the piston 18 of press A² and to the upper side of the piston 18 of press A'. This has the effect to close the valve 16 of press A' while the compressing-piston 6 of this press is advancing and operating and to open the valve 16 of press A² and while the compressing-piston 6 of this latter press is being retracted. Thus while the filtering process in press A' is going on the valve 16 thereof cuts off the influx of the fluid mixture to be filtered, and while the compressing-piston of press A² is being withdrawn the valve 16 thereof is opened to permit the chamber s to fill with such fluid mixture. The outlet end (e in Fig. 5) of the chamber s will be at starting stopped or closed by any suitable means, so that the chamber will retain the liquid substance until the pressure of the piston 6 produces a cake of the solider material. Afterward the closure may be removed, as the plug or stopper formed by the cake of solid material will serve to resist the pressure, one cake forcing the other out in the alternating movement of the piston 6. In order to increase the resistance of the cake to the pressure, the press is or may be provided with pointed screws 25, Fig. 5, set in the side plates, as clearly shown. The screws split the cake as it is being forced out and obviously increase the resistance to its movement.

The two presses and the intermediate engine are connected by tie-rods and nuts 26, as clearly shown. These rods and the bolts 5 pass rather loosely through the parts of the presses, so as to admit of some adjustment of the parts. This looseness is effected by making the holes or bores, through which the bolts and rods pass, somewhat larger than the latter.

In the simpler form of filter-press shown in Figs. 8 and 9 the principle is the same as in the form already described. In this construction the press has a base-piece 1ª; a cap-piece 2ª; bolts 5ª, with square bodies which serve as a backing for the filter-plates 4; end blocks 27 and 27ª, into which the filter-plates are shouldered at their ends, as seen at 28 in Fig. 8, in order to distance them and form the press-chamber s, and a piston 6ª operatable by any means or power. The fluid substance to be filtered is introduced at 13ª, and this supply-inlet is controlled by a suitable valve 16ª, which may be operated by hand. The filter-plates are constructed precisely the same as before described, and a screw or screws 25ª are set in the end block 27. These serve, primarily, to hold in place a stopper or plug 29 when the press is started and may be driven out into the passage to serve as obstruction, in the same manner as the screws 25 when the plug 29 shall have been removed.

The movement of the compressing-piston in the manner shown serves to keep the inner surfaces of the filter-plates quite clean, and this is an important feature with this class of filtering devices.

Obviously the special disposition of the filter-plates, as shown in the drawings—that is, with the planes of the interstices between the laminæ horizontal and the compressing-piston moving in a horizontal path—is not essential to the invention. Other dispositions would give good results.

Having thus described my invention, I claim—

1. A filter-plate, for use in a filter-press, composed of a plurality of very thin and flexible sheets of metal disposed face to face, and means for pressing said sheets together with a regulable pressure.

2. A filter-press, having a filter-plate composed of a plurality of thin and flexible sheets of non-absorbent material disposed face to face, and means for pressing said sheets together, said filter-plate forming a wall of the press-chamber with the edges of the sheets presented to said chamber and providing a multiplicity of outlets per unit of filtering-surface, and means for forcing the liquid from the chamber outward through the interstices in said plate.

3. A filter-press, having a filter-plate composed of a plurality of thin sheets of non-absorbent material disposed face to face, and means for pressing said sheets together, such filter-plate forming a wall of the press-chamber, and a compressing-piston playing in said chamber, said piston movable in a path substantially at right angles to the path of the fluid through the interstices between said sheets.

4. A filter-press, having a base-piece, a cap-piece, two filter-plates of laminated structure between said base and cap pieces and forming side walls of the press-chamber, a valve-controlled inlet to said chamber for the fluid mixture to be filtered, and a reciprocating compressing-piston playing in said press-chamber, the path in which said piston travels being in a direction substantially at right angles to that in which the fluid flows through the interstices between the laminæ of the filter-plates.

5. A filter-press, having a recessed base-piece, a recessed cap-piece, two side plates, two laminated filter-plates 4, at the respective sides of the press-chamber, said plates being backed by said side plates and compressed between said base and cap pieces, valve-controlled means for supplying fluid to said press-chamber, and a compressing-piston having a reciprocating movement in said chamber longitudinally of the laminæ of the filter-plates.

6. A filter-press, having a base-piece 1, a cap-piece 2, with a supply-inlet for the fluid, a valve-chamber, and a port leading from the valve-chamber to the press-chamber, the side plates 3, the laminated filter-plates 4, forming the sides of the press-chamber and each composed of superposed thin sheets of metal pressed together between said base-piece and cap-piece, a compressing-piston 6 in the press-chamber, a valve 16 in the valve-chamber and controlling the port leading to the press-chamber, and means for imparting alternate reciprocating movements to the said valve 16 and piston 6, as set forth.

7. A filter-press, having a press-chamber open at its ends and with its sides formed of filter-plates 4, a reciprocating compressing-piston extending into said chamber from one of its open ends and means for resisting the forcing out of the cake of solid material at the opposite end of said chamber.

8. A filter-press, having a compressing-chamber, a reciprocating piston which fits and plays in said chamber, and a filter-plate forming a side of said chamber, said plate being made up of thin, superposed sheets of metal with their edges presented to a side of the piston.

In witness whereof I have hereunto signed my name this 20th day of October, 1904, in the presence of two subscribing witnesses.

MARTIN EKENBERG.

Witnesses:
ERNST SVANGVIST,
ROBERT APELGREN.